US008364823B2

(12) United States Patent
Cromwell et al.

(10) Patent No.: US 8,364,823 B2
(45) Date of Patent: Jan. 29, 2013

(54) SELF-CONFIGURING IP VIDEO ROUTER

(75) Inventors: Mark C. Cromwell, Plano, TX (US);
Richard K. Wiles, Plano, TX (US);
Dennis K. Smith, Plano, TX (US);
James W. Dickerson, Plano, TX (US)

(73) Assignee: Agilemesh, Inc., Richardson, TX (US)

( * ) Notice: Subject to any disclaimer, the term of this patent is extended or adjusted under 35 U.S.C. 154(b) by 801 days.

(21) Appl. No.: 12/099,286

(22) Filed: Apr. 8, 2008

(65) Prior Publication Data
US 2008/0247457 A1 Oct. 9, 2008

Related U.S. Application Data

(60) Provisional application No. 60/910,764, filed on Apr. 9, 2007.

(51) Int. Cl.
*H04N 11/04* (2006.01)
(52) U.S. Cl. .................. 709/227; 375/240.01
(58) Field of Classification Search .................. 709/227, 709/238; 375/240.01
See application file for complete search history.

(56) References Cited

U.S. PATENT DOCUMENTS

| 5,544,161 | A * | 8/1996 | Bigham et al. | 370/397 |
| 5,794,116 | A * | 8/1998 | Matsuda et al. | 725/114 |
| 7,774,494 | B2 * | 8/2010 | Hauke | 709/237 |
| 7,978,874 | B2 * | 7/2011 | Levy | 382/100 |
| 2002/0046403 | A1 * | 4/2002 | Kim et al. | 725/37 |
| 2004/0071087 | A1 * | 4/2004 | Siev et al. | 370/235 |
| 2005/0170843 | A1 * | 8/2005 | Billhartz et al. | 455/456.1 |
| 2005/0188256 | A1 * | 8/2005 | Stager et al. | 714/13 |
| 2006/0126613 | A1 * | 6/2006 | Zweig | 370/389 |
| 2006/0250976 | A1 * | 11/2006 | Wing et al. | 370/252 |
| 2007/0162945 | A1 * | 7/2007 | Mills | 725/119 |
| 2010/0005180 | A1 * | 1/2010 | Tyukasz et al. | 709/228 |

OTHER PUBLICATIONS

Keller et al., "An active router architecture for multicast video distribution," INFOCOM 2000. Nineteenth Annual Joint Conference of the IEEE Computer and Communications Societies. Proceedings. IEEE , vol. 3, no., pp. 1137-1146 vol. 3, Mar. 26-30, 2000.*

* cited by examiner

*Primary Examiner* — Wing F Chan
*Assistant Examiner* — Kostas Katsikis
(74) *Attorney, Agent, or Firm* — Baker & McKenzie LLP

(57) ABSTRACT

The embodiments described in this disclosure address the above issues and others. Accordingly, a self-configuring IP video router provides a plug-and-play transport interface between two LANs, one of which is the host to multiple IP video cameras or servers.
In accordance with an aspect of the disclosure, plug-and-play functionality provides that the device can be connected to both networks via standard hardware interfaces, discover the video sources on the "inside" network, and configure itself to do the appropriate IP address mapping and IP port transport across the interface between the networks.

11 Claims, 2 Drawing Sheets

Standalone IP Video Network

Video LAN - Data
LAN Interconnection

SELF-CONFIGURING IP VIDEO ROUTER

CROSS-REFERENCE TO RELATED APPLICATIONS

This application claims the benefit of U.S. Provisional Patent Application Ser. No. 60/910,764, filed Apr. 9, 2007, and entitled "Self-Configuring Internet Protocol (IP) Video Router," which is commonly assigned with the present application and incorporated herein by reference for all purposes.

BACKGROUND

1. Field of the Invention

The disclosed embodiments relate generally to IP routing systems and, more specifically, to a self-configuring IP video router providing a plug-and-play transport interface between two LANs, one of which is the host to multiple IP video cameras or servers.

2. Background of the Invention

Increasing application of Internet Protocol-based (IP-based) video cameras and video servers, particularly for surveillance and security purposes, has resulted in a number of private Local Area Network (LAN) deployments for local monitoring. With the introduction of wireless mesh technologies, many of these monitoring deployments have become wireless due to the convenience of installation of these Ad-Hoc type networks. Many of these installations, both wired and wireless, involve the use of a local monitoring, control and recording station which is also a node on the same network. An example of this type of configuration is illustrated in FIG. 1.

Often, as shown by FIG. 1, these networks have as their only or primary purpose the collection and monitoring of IP video due to the stringent bandwidth requirements associated with the video surveillance application. Industry experience has shown that the transport of video on a predominately data network often results in degradation of the quality of the video and introduction of non-deterministic delays in network data tasks such as web access, file transfer or network printing. This has resulted in a need to segregate the functions of the networks (for network traffic management) with interconnection of the video LAN to other more data oriented LAN networks for selective viewing purposes.

Interconnection with other private LANs generally requires the use of a router device between the networks, as shown in FIG. 2. This router is used to translate addresses and to manipulate IP ports to allow the transport of the video across the interface between the networks. The router has a network address (typically a private network address, for this application) on each of the two networks being interconnected. For the purposes of illustration, the side of the router connected to the network that includes the IP video sources is referred to as the "inside" interface while the other side of the router is referred to as the "outside" interface.

Unfortunately, configuration of such a router is typically an involved manual process. While some commercial routers are currently available and could be used for this purpose, there is no standard terminology or configuration interface that would make it possible to specify in detail the setup steps for a general case.

Currently, transport of IP video between networks requires the insertion of a router device to handle the address translation. Most routers include a firewall which also restricts the use of most IP ports, unless specifically configured otherwise. Configuration of the router involves at least the following steps:

(a) Address specification on the "outside" network. This is accomplished either manually through an interactive setup procedure, or automatically through use of the Dynamic Host Configuration Protocol (DHCP).

(b) For each video source on the "inside" network, anywhere from one to three unique IP ports (one for the video stream, one for control and configuration access and possibly one for Pan-Tilt-Zoom control pass-through) must be configured on the appropriate IP camera or video server. For example, if there are five cameras (or video servers) on the video network, this step must be performed five times.

(c) For each of the video sources on the "inside" network to be made available on the "outside" network, each of the unique IP ports (again, one to three ports per IP video source) must be configured in the router for "Port Forwarding". For example, if there are five cameras (or video servers) on the video network, this step be performed five times.

In addition, access to the video being generated by the network attached cameras currently requires the user to know the IP address of the video source and enter it into a browser or special viewing software, depending on the capabilities of the video source device.

Consequently, the setup of a router to allow transport of IP video between two networks is a difficult, laborious, and time-consuming task that requires a user to have an expert understanding of both network router concepts and of the configuration interface of the particular commercial router selected for this application.

SUMMARY OF THE INVENTION

The embodiments described in this disclosure address the above issues and others. Accordingly, a self-configuring IP video router provides a plug-and-play transport interface between two LANs, one of which is the host to multiple IP video cameras or servers.

In accordance with an aspect of the disclosure, plug-and-play functionality provides that the device can be connected to both networks via standard hardware interfaces, discover the video sources on the "inside" network, and configure itself to do the appropriate IP address mapping and IP port transport across the interface between the networks.

BRIEF DESCRIPTION OF THE DRAWINGS

Embodiments are illustrated by way of example in the accompanying figures, in which like reference numbers indicate similar parts, and in which.

DETAILED DESCRIPTION OF THE EMBODIMENTS

Automated Discovery of Video Sources

Figure 1:
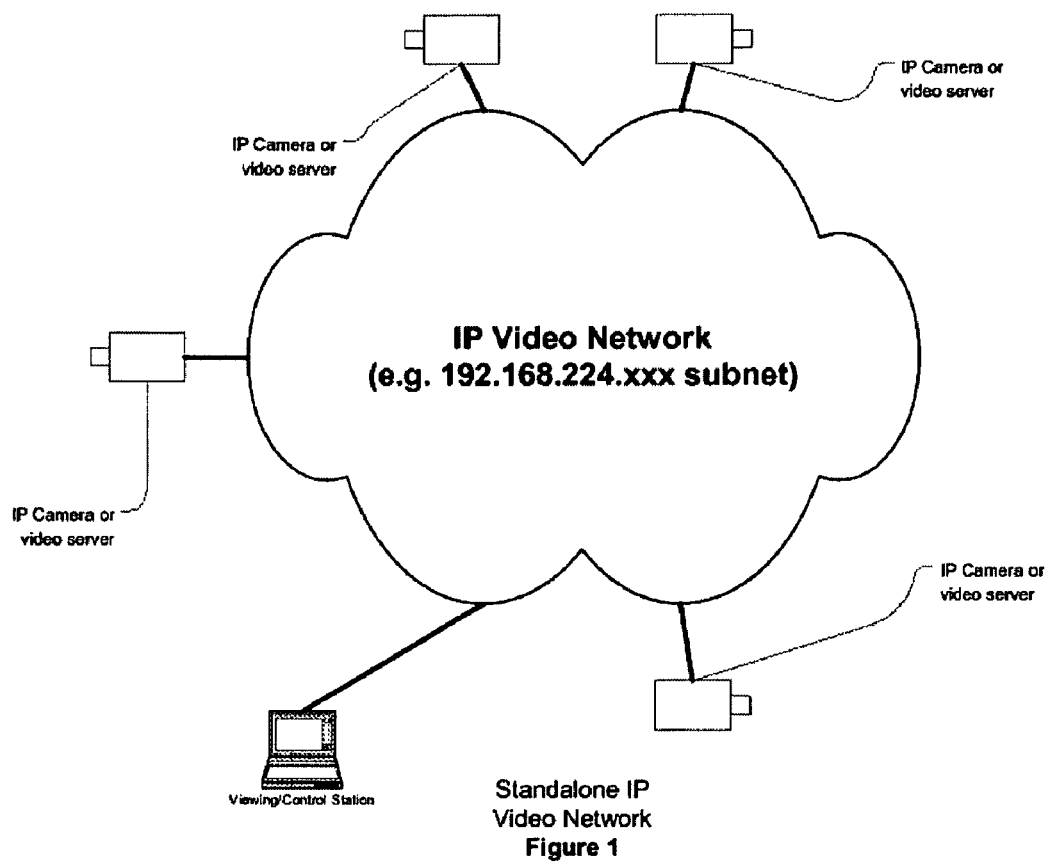
FIG. 1 is an exemplary standalone IP video network configuration displaying a local monitoring, control and recording station which is also a node on the same network.
Figure 2:
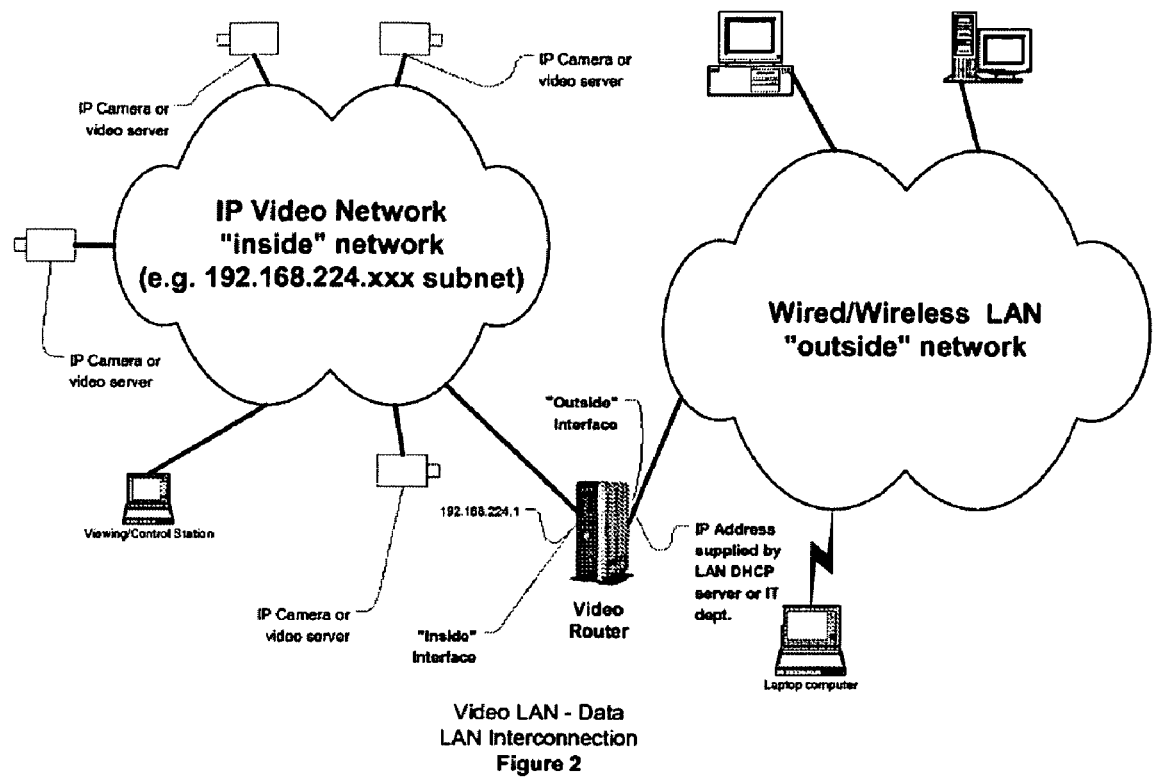
FIG. 2 is an exemplary video LAN displaying the data LAN interconnection with a router device between the networks.

A unique capability of the Automatic Video Router (AVR) is the automatic discovery of video nodes attached to the local network. This is generally accomplished by:

(a) The video router issues a broadcast message intended to stimulate the reply of any local subnet network video sources. The mechanism used can be a general purpose message like an ICMP broadcast ping or some other special purpose broadcast message.
(b) All of the network video source devices (and potentially other local network devices) would respond to the broadcast message.
(c) For each response from a device, the video router uses the Media Access Controller (MAC) address to determine whether a device is a source of video supported by the router.
(d) If the responding device is a supported video source, the Internet Protocol (IP) address of the device, along with an identification of the video source manufacturer is saved in a Video Device Table in the router.

DHCP Service Toward Devices on the Inside Network

The AVR device may also include a Dynamic Host Control Protocol (DHCP) server that provides IP addresses to requesting network devices (e.g. personal computers or IP cameras) on the inside network. This service, in combination with the other automated services implemented on the AVR, adds another aspect to the "plug and play" nature of the device. Using this service, a user may plug in a network device and be instantly configured to communicate with the other network devices attached to the inside network.

Automated Self-Configuration for Routing Between Networks

Based on the information collected during the automated discovery process and as a result of AVR-based DHCP server, the AVR self-configures port forwarding from the inside to the outside networks. This has the effect of automatically defining paths through the router for the video source devices on the inside network and for the devices to which IP addresses have been served.

Algorithmic Mapping of Video Source IP Addresses to Outside Network Ports

One of the difficulties associated with conventional Network Address Translation (NAT) IP address mapping through a general purpose router is that, typically, for each address to be mapped through the router from the outside network to the outside network, one or more port numbers should be assigned. This is often a manual process. If an automatic assignment of a port number associated with a particular inside network (generally a private network IP address) is performed, as is often the case, a TCP/IP session initiated from the outside network requires the initiator to know the outside network port number and the outside network IP address of the router to uniquely identify the desired destination address on the inside network.

The AVR approach to automatic port assignment is to use a predetermined mapping, or algorithm, based on the inside network address being translated to assign the outside network port number. This allows a user who knows the inside network IP address of the desired device to predict the port number assigned to that address on the outside network.

One example of such a mapping or algorithm is to simply take the last three digits of the IP address of a device attached to the inside network and add those as an offset to a predetermined base port address. In Table 1, below, the predetermined base port address is 7000. Thus, the outside network IP port number associated with IP address 192.168.224.049 would be 7049. Likewise, the outside network port number associated with a device having an inside network IP address of 192.168.224.142 would be 7142.

Any number of other algorithmic mappings are possible. This aspect of the disclosure is associated with the concept of making it feasible for a user to determine the outside network port number for an inside network device simply by knowing the IP address of the device.

TABLE 1

| IP Address | Outside Port # |
|---|---|
| 192.168.224.49 | 7049 |
| 192.168.224.52 | 7052 |
| 192.168.224.55 | 7055 |
| 192.168.224.58 | 7058 |
| 192.168.224.61 | 7061 |
| 192.168.224.64 | 7064 |
| 192.168.224.67 | 7067 |
| 192.168.224.70 | 7070 |
| 192.168.224.73 | 7073 |
| 192.168.224.112 | 7112 |
| 192.168.224.115 | 7115 |
| 192.168.224.118 | 7118 |
| 192.168.224.121 | 7121 |
| 192.168.224.124 | 7124 |
| 192.168.224.127 | 7127 |
| 192.168.224.130 | 7130 |
| 192.168.224.133 | 7133 |
| 192.168.224.136 | 7136 |
| 192.168.224.139 | 7139 |
| 192.168.224.142 | 7142 |
| 192.168.224.145 | 7145 |

DHCP Client Toward the Outside Network

Another task to be accomplished as part of insertion of a router between two networks is to assign a network address to the router in the outside network. Undesirably, this is often a manual process. In accordance with an aspect of the disclosure, the AVR can take advantage of the availability of a DHCP server on the outside network and request an automatically assigned IP address. This capability, in association with other aspects taught herein allows the AVR to be connected between the networks, often without requiring any manual configuration.

Replication of Video Streams Toward Outside Network

The video orientation of the AVR device allows the addition of another feature that further distinguishes it from other products. Since information is automatically collected that identifies the video sources on the inside network, the AVR can help solve another problem that often plagues private networks, particularly wireless private networks. Avoidance of duplicate video data streams on a wireless network is particularly beneficial to efficient use of limited bandwidth on the network.

In accordance with another aspect of the disclosure, the AVR helps solve this problem by providing a facility that can collect a single video stream from each video source on the inside network and replicate each of the streams multiple times toward video consumers on the outside network.

Automatic DDNS Setup Based on Video Source Names

IP video sources on a network may be assigned an alpha-numeric name that carries more meaning than a simple IP address (such as the location or device identification). These names are often only used to display an identifier on the IP video image. In accordance with another aspect, generally, the AVR may add another level of functionality by automatically pulling the name information from each of the video sources on the inside network and building a map between each device name and the IP address at which it is located. This mapped information may then be made available via a Dynamic Domain Name Service (DDNS) embedded in the AVR. The net result is that users on the outside network (when properly configured to make use of the DDNS) may address the IP video sources on the inside network by using the name of the device rather than its IP address.

Manual One-to-One Remapping of IP Addresses Between the Inside and Outside Networks Occasionally, it is desirable to map the IP addresses of multiple devices on the inside network to multiple unique addresses on the outside network. The AVR makes this capability available, as well, through web-based setup options and through a graphical user interface to allow user-friendly manual configuration.

Automatic Port Forwarding for Inside IP Addresses Assigned Via DHCP

As mentioned with reference to another aspect of the disclosure, the AVR may assign IP addresses to devices on the inside network via the DHCP protocol. An additional unique capability of the AVR is that it may also build entries into its port forwarding table. The result of this is that devices attached to the inside network become automatically addressable through the router from the outside network.

Automatic Dynamic Video Web Page Generation

In accordance with another aspect, automatically discovered IP video sources on the inside network may be used by the AVR to dynamically build an embedded web page that lists the video sources, provides a table of snapshots from each of the video sources and provides web-based links that allow users to access any of these video sources simply by clicking on the link.

What is claimed is:

1. An automatic video router for providing a transport interface between first and second networks, wherein:
   the first network is operable as a host to multiple Internet Protocol (IP)-based video systems;
   the second network is separate from the first network; and
   the router is connected to the first and second networks, the router comprising plug-and-play functionality operable for:
   providing a connection to both of the first and second networks via standard hardware interfaces; and
   discovering the video sources on the first network,
   wherein the discovering of the video sources includes determining whether a device on the first network is a video source based on a Media Access Controller (MAC) address of the device received by the router in response to a broadcast message issued from the router.

2. The automatic video router according to claim 1, wherein the automatic video router is further operable for automatically providing respective IP addresses to video sources during the discovering of video sources.

3. The automatic video router according to claim 2, wherein, for at least one video source automatically provided with an IP address, the automatic video router is further operable for automatically assigning a port number to the IP address, the port number being addressable from the second network.

4. The automatic video router according to claim 3, wherein the port number is assigned based on a predetermined algorithm for mapping between IP addresses and the port numbers.

5. The automatic video router according to claim 4, wherein the predetermined algorithm for mapping includes mapping the port number to the IP addresses so that the port number and IP address each include an identical subset of digits.

6. The automatic video router according to claim 2, wherein, for at least one video source automatically provided with an IP address, the automatic video router is further operable for assigning an alphanumeric name to the video source.

7. The automatic video router according to claim 6, wherein the assigning of the alphanumeric name to the video source includes retrieving, by the automatic video router, name information from the video source and mapping the alphanumeric name to the IP address of the video source.

8. The automatic video router according to claim 1, wherein the automatic video router is further operable for receiving a video stream from the device on the first network and outputting a plurality of replicas of the video stream to the second network.

9. The automatic video router according to claim 1, wherein the automatic video router is further operable for generating a web page that includes a list of video sources on the first network.

10. The automatic video router according to claim 9, wherein the web page further includes a table of snapshots from each of the video sources on the first network.

11. The automatic video router according to claim 9, wherein the web page further includes links to the video sources on the first network.

* * * * *